United States Patent
Nagase et al.

(10) Patent No.: US 8,218,888 B2
(45) Date of Patent: Jul. 10, 2012

(54) MOTION BLUR DETECTING APPARATUS AND METHOD, IMAGE PROCESSING APPARATUS, AND IMAGE DISPLAY APPARATUS

(75) Inventors: Akihiro Nagase, Tokyo (JP); Jun Someya, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 632 days.

(21) Appl. No.: 12/517,434

(22) PCT Filed: Feb. 12, 2009

(86) PCT No.: PCT/JP2009/052285
§ 371 (c)(1),
(2), (4) Date: Jun. 3, 2009

(87) PCT Pub. No.: WO2009/107487
PCT Pub. Date: Sep. 3, 2009

(65) Prior Publication Data
US 2010/0158402 A1   Jun. 24, 2010

(30) Foreign Application Priority Data
Feb. 25, 2008   (JP) .................................. 2008-042546

(51) Int. Cl.
*G06K 9/40* (2006.01)
(52) U.S. Cl. .... 382/255; 345/87; 348/208.1; 348/208.4; 348/208.99
(58) Field of Classification Search .................... None
See application file for complete search history.

(56) References Cited

U.S. PATENT DOCUMENTS

| 8,098,333 | B2 * | 1/2012 | Poon | 348/607 |
| 2005/0231603 | A1 * | 10/2005 | Poon | 348/208.99 |
| 2006/0257042 | A1 * | 11/2006 | Ofek et al. | 382/255 |
| 2006/0280249 | A1 * | 12/2006 | Poon | 375/240.16 |
| 2008/0297613 | A1 * | 12/2008 | Takahashi et al. | 348/221.1 |

FOREIGN PATENT DOCUMENTS

| JP | 9-312788 A | 12/1997 |
| JP | 10-262160 A | 9/1998 |
| JP | 2002-16820 A | 1/2002 |
| JP | 3251127 B2 | 1/2002 |
| JP | 2004-80252 A | 3/2004 |
| JP | 2005-318251 A | 11/2005 |
| JP | 2006-317660 A | 11/2006 |

* cited by examiner

Primary Examiner — Jason M Repko
Assistant Examiner — Siamak Harandi
(74) Attorney, Agent, or Firm — Birch, Stewart, Kolasch & Birch, LLP

(57) ABSTRACT

Motion blur periods (bf) are detected (14) from gradation differences (g1) between a first image signal (d1) and a second image signal (d2), gradation differences (g2) between the second image signal (d2) and a third image signal (d3), and results of the detection of transition periods (h) in the gradations of the second image signal (d2), and the second image signal (d2) is corrected (3) only during the detected motion blur periods (bf). Transition periods (h) are deemed to occur when, for example, the absolute value of a gradation change in the second image signal is greater than a first predetermined threshold value (S1) and less than a second predetermined threshold value S2 (<S2). Motion blur in the image signal can be detected without increased circuit size, and accordingly, the detected motion blur can be reduced.

14 Claims, 15 Drawing Sheets

FIG.4
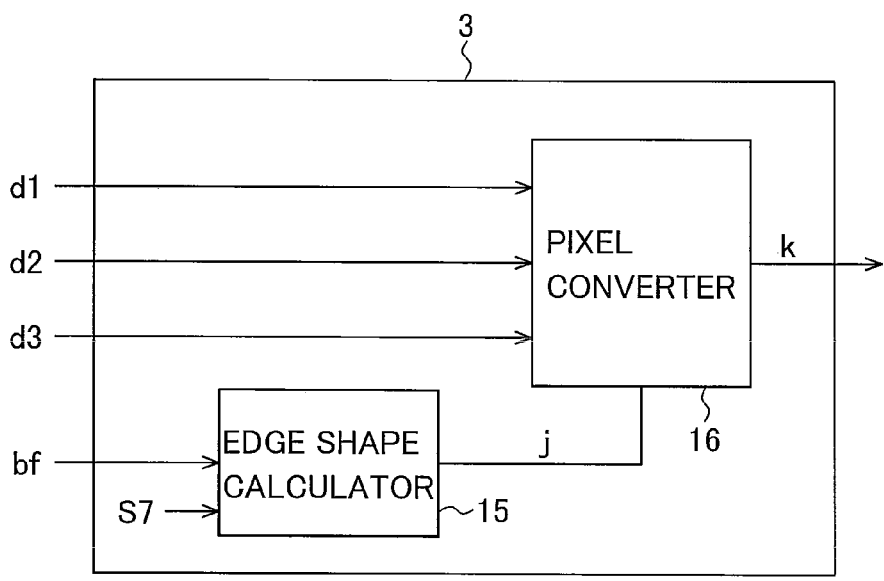
FIG.5(a) SYI
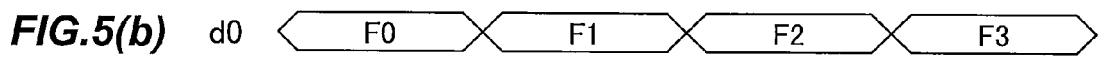
FIG.5(b) d0
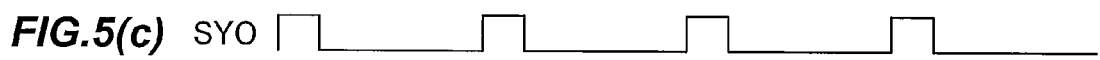
FIG.5(c) SYO
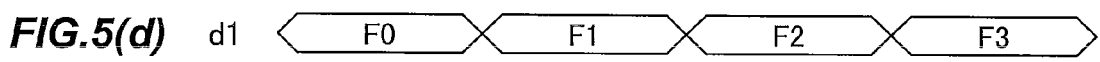
FIG.5(d) d1
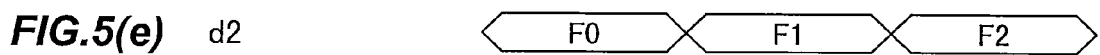
FIG.5(e) d2
FIG.5(f) d3

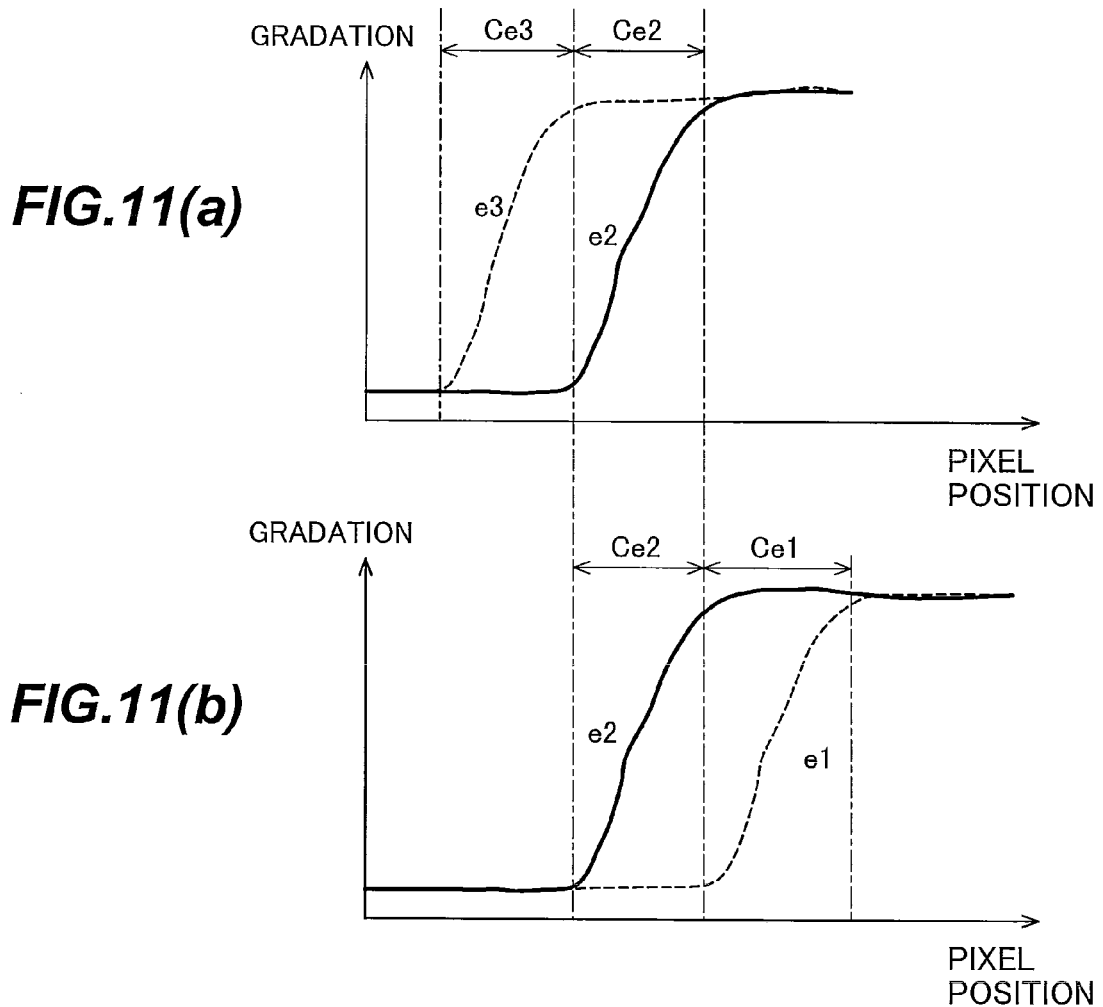
FIG.11(a)
FIG.11(b)
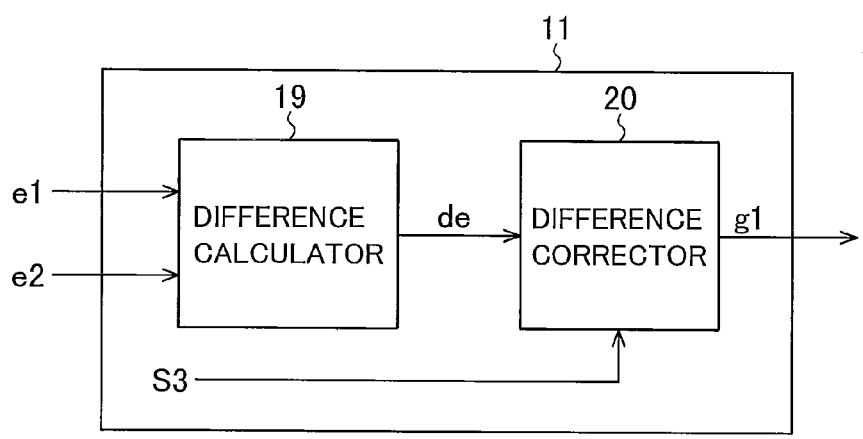
FIG.12

FIG. 15
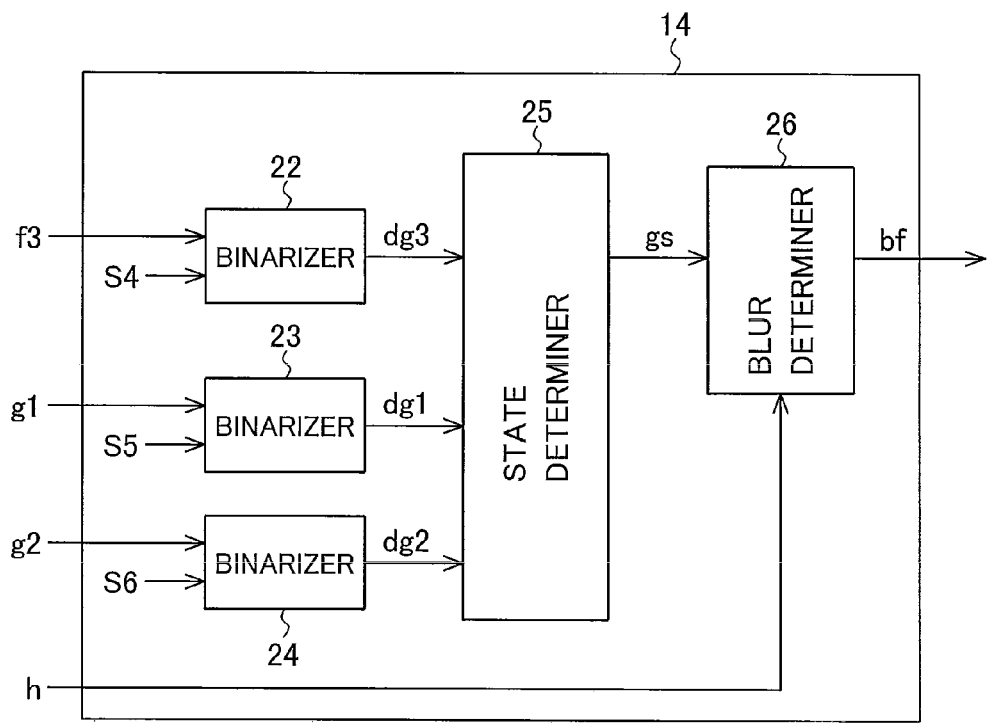
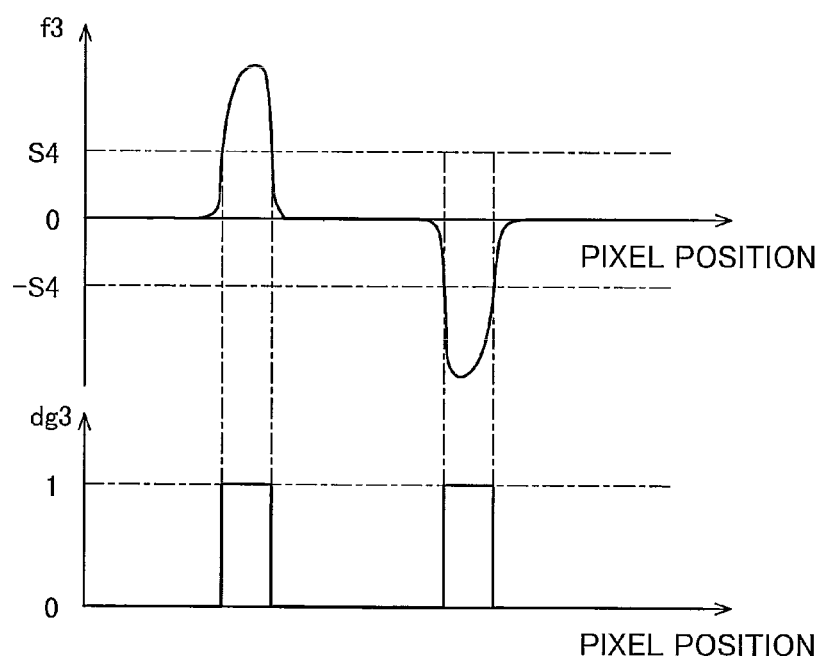
FIG.16(a)
FIG.16(b)

FIG. 17
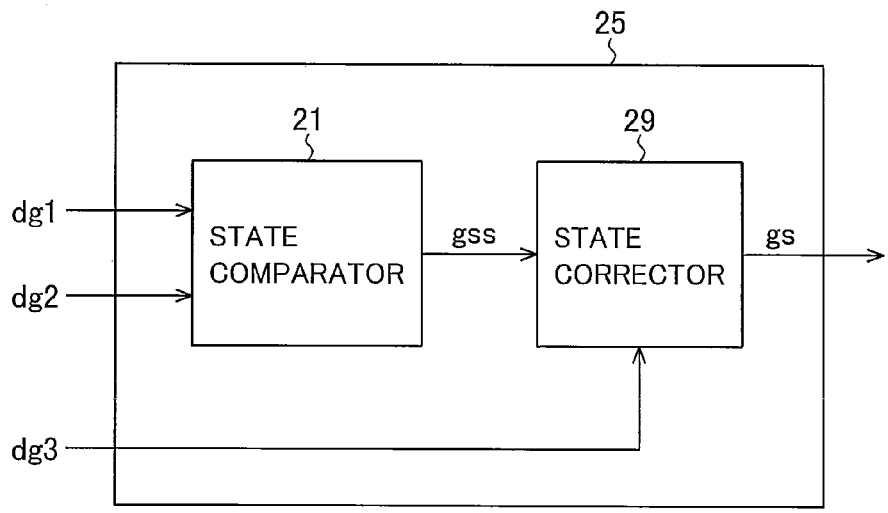
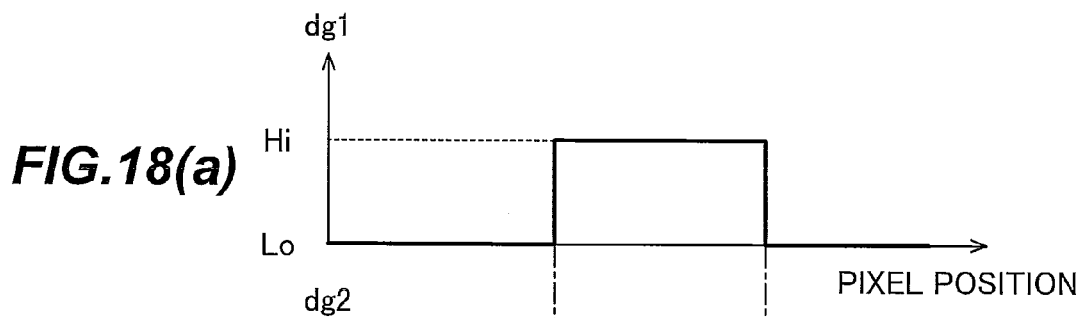
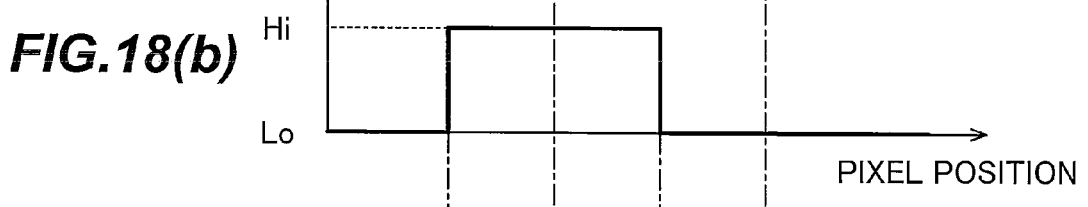
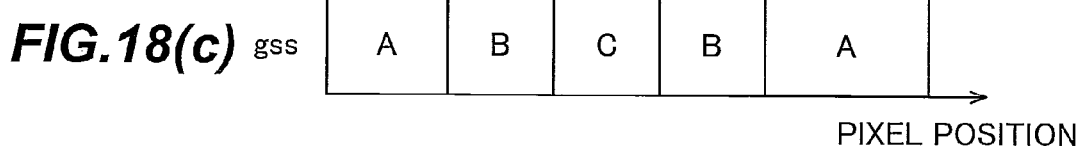
IF dg1=Lo AND dg2=Lo, THEN gss=A
IF dg1≠dg2, THEN gss=B
IF dg1=Hi AND dg2=Hi, THEN gss=C

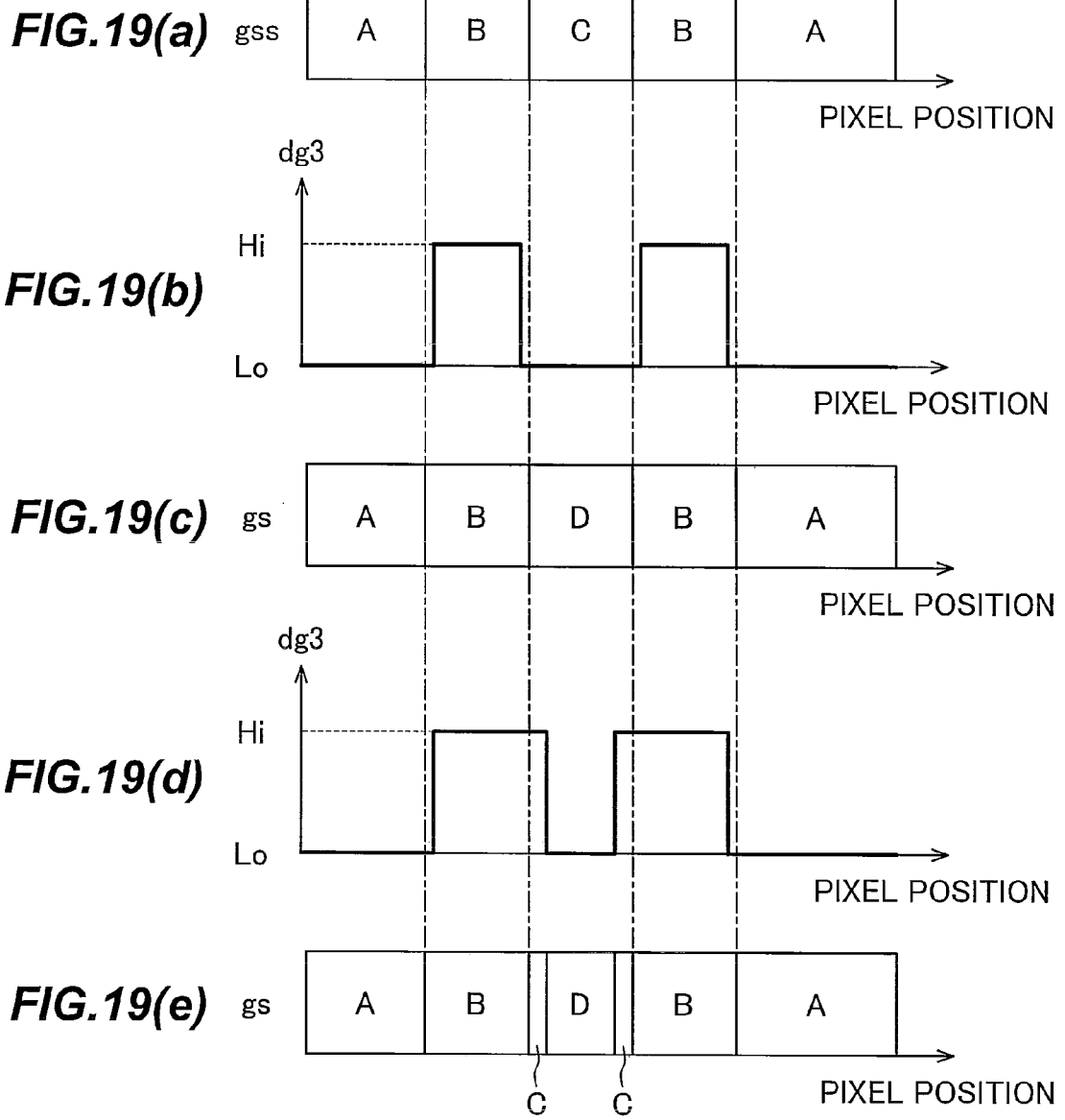

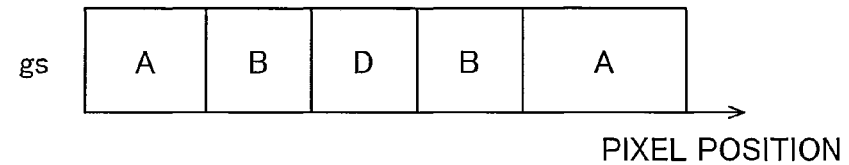
FIG.20(a)
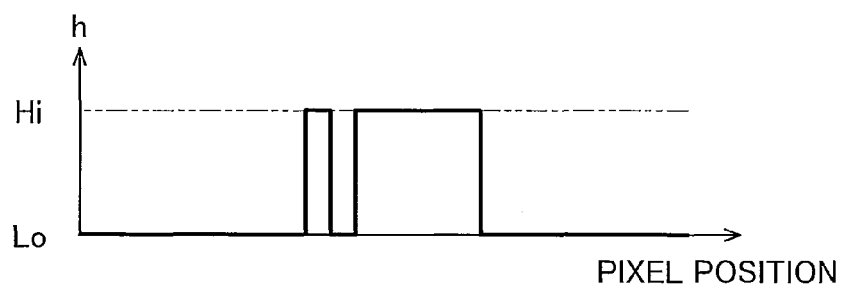
FIG.20(b)
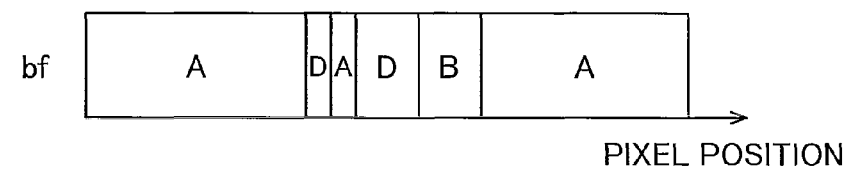
FIG.20(c)
FIG.21
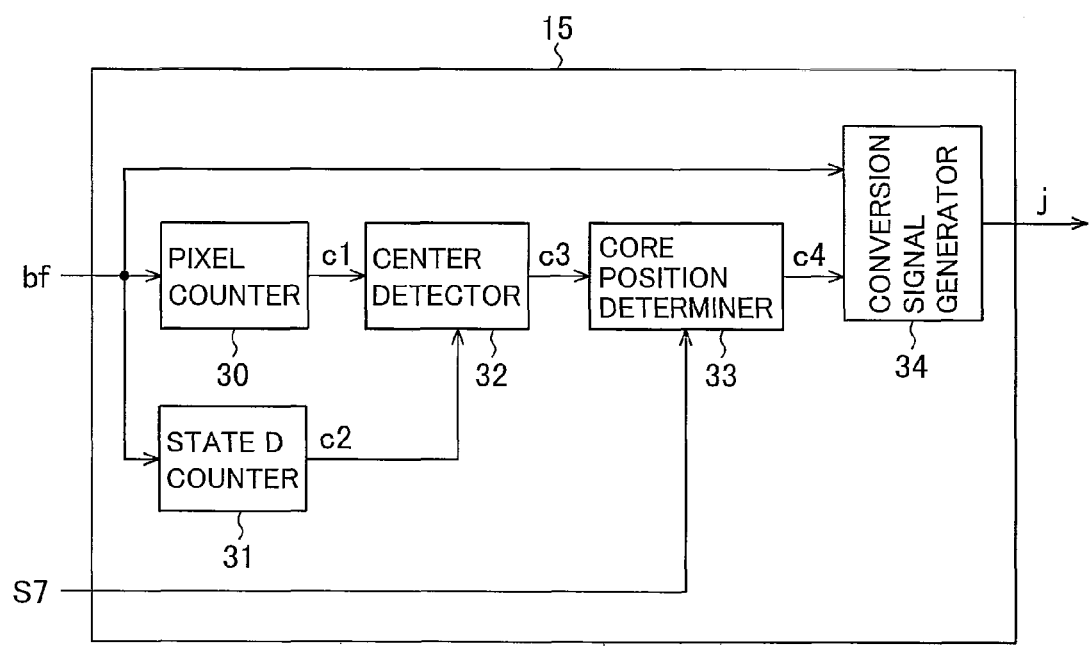

FIG.22(a) bf 
FIG.22(b) c1 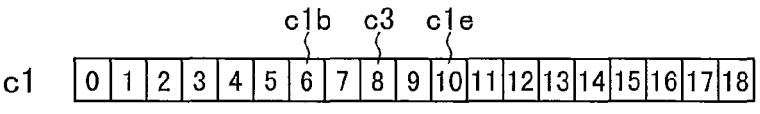
FIG.22(c) c2 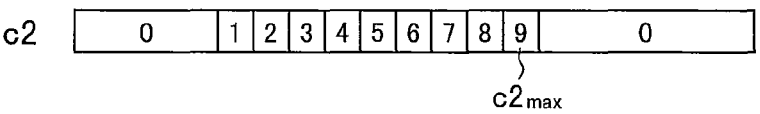
FIG.22(d) c4 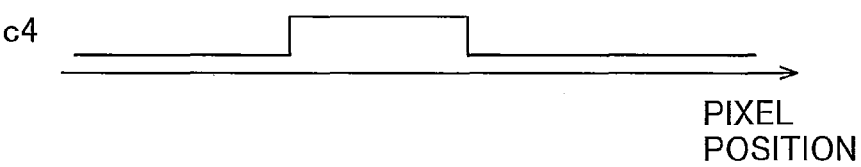
PIXEL POSITION
FIG.23(a) bf 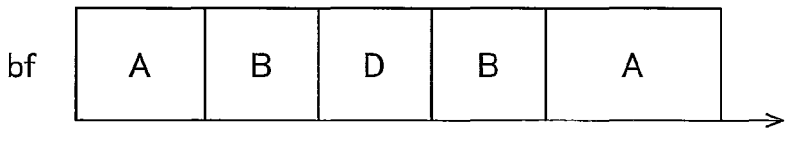
PIXEL POSITION
FIG.23(b) c4 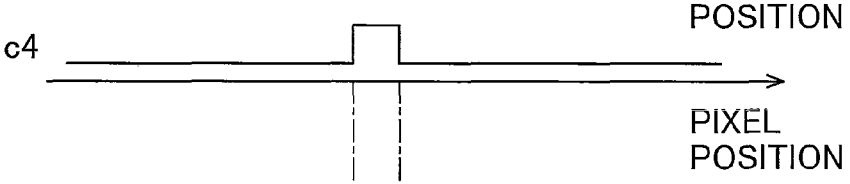
PIXEL POSITION
FIG.23(c) j 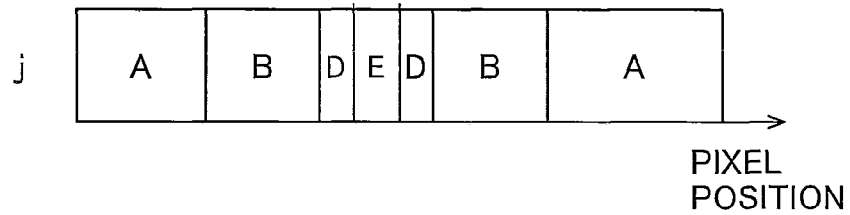
PIXEL POSITION

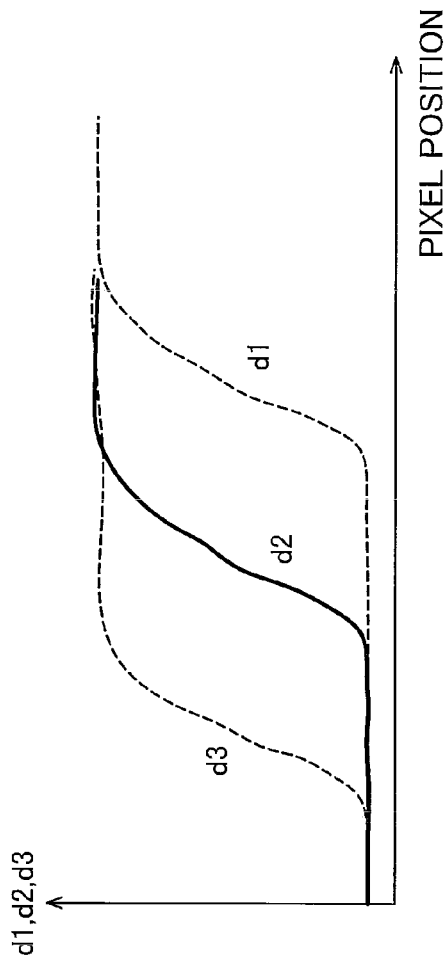
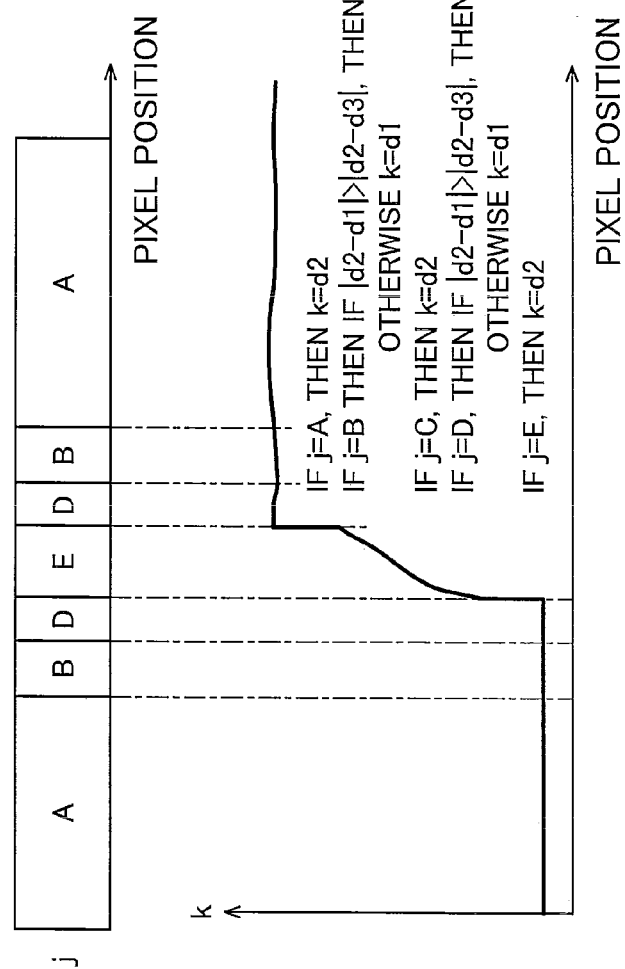
FIG.24(a)
FIG.24(b)
FIG.24(c)

MOTION BLUR DETECTING APPARATUS AND METHOD, IMAGE PROCESSING APPARATUS, AND IMAGE DISPLAY APPARATUS

FIELD OF THE INVENTION

The present invention relates to a motion blur detecting apparatus and method, an image processing apparatus, and an image display apparatus.

BACKGROUND ART

Conventional cathode ray tube (CRT) image display apparatuses are rapidly being replaced with liquid crystal, plasma, and other flat-panel displays. In the early days when liquid-crystal displays were first developed, their motion display performance, which was greatly inferior to that of CRTs, was regarded as problematic. This problem was due to the slow response speed of the liquid crystal, and more generally to the effect of motion blurring caused by any display of the hold type.

With technological progress in recent years, the problem of slow liquid crystal response has been largely overcome by improvements in liquid crystal materials and the development of over-drive technology. In relation to the problems caused by use of a hold-type display, a method of displaying black images between frames to be displayed and a method of generating new sub-frames by employing image interpolation techniques have been proposed. As the motion display performance of flat-panel displays is being improved in this way, a need has arisen to deal with motion blur included in the video images received by the improved display apparatus.

Image signals received by display apparatuses are obtained by quantizing the total amount of light received by the photodetector of a camera from a subject during a frame integration time (1/60 second, for example) and are arranged in a standardized pixel sequence. When there is relative motion between the photodetector of the camera and the subject, edges of the subject may be blurred (referred to as motion blur below) depending on the frame integration time and the relative speed of the camera and the subject.

As a method of reducing blur in images, a method employing a zooming circuit has been disclosed, as in Patent Document 1, for example. This method is expected to be effective for isotropic narrow-width blur caused by out-of-focus conditions at the time of image capture or other such problems, because it can sharpen the rise and fall of edges in an image by using filtering techniques without adding overshoot or undershoot. In motion blur, however, unlike image blur caused by out-of-focus conditions and the like, the blur width varies greatly depending on the relative velocity between the camera and the subject, and since the direction in which blur occurs is anisotropic (blur occurs only the direction of the velocity vector of the motion between the camera and the subject), it is difficult to employ the prior art.

A blur function deconvolver technique using motion vector detection is disclosed in Patent Document 2. This technique requires a large amount of computation and for reasons of cost it is difficult to implement in practical circuitry.

Patent Document 1: Japanese Patent Application Publication No. 2002-16820
Patent Document 2: Japanese Patent No. 3251127

DISCLOSURE OF THE INVENTION

Problems to be Solved by the Invention

Differing from isotropic blur caused by out-of-focus conditions and the like, the width of motion blur in image signals varies from narrow to wide, and the direction of the blur is anisotropic, so the use of methods that employ filtering techniques to perform a frequency conversion uniformly on the screen do not always produce suitable results.

If a filter is optimized to be able to correct motion blur with a wide blur width, then images such as a lamp-lit scenes having edges with low rates of brightness change may also be filtered, and mistakenly converted to images other than the image that should be displayed.

A problem with using motion vector detection techniques to identify the direction of motion of the subject and perform adaptive filtering has been that the increased size of the detection circuitry makes practical application difficult for cost reasons.

The present invention addresses the above problems with the object of detecting motion blur in image signals without increasing circuit size, thereby enabling the detected motion blur to be reduced.

Means of Solution of the Problems

A motion blur detector according to the present invention has:

a delay means for generating a first image signal with no frame delay with respect to an input image signal, a second image signal with a delay of a first predetermined number of frames with respect to the input image signal, and a third image signal with a delay of the first predetermined number of frames with respect to the second image signal;

a first difference detection means for detecting gradation differences between the first image signal and the second image signal;

a second difference detection means for detecting gradation differences between the second image signal and the third image signal;

a third difference detection means for detecting gradation differences between the first image signal and the third image signal;

a differentiation means for detecting signal changes between adjacent pixels in the gradation differences detected by the third difference detection means; and a transition period detection means for detecting gradation changes between adjacent pixels in the second image signal, and using the gradation changes to detect gradation transition periods in the image signal;

the motion blur detector detects motion blur periods based on the gradation differences detected by the first difference detection means, the gradation differences detected by the second difference detection means, differentiation results detected by the differentiation means, and the gradation transition periods in the second image signal detected by the transition period detection means.

Effect of the Invention

The present invention can detect motion blur included in an input image signal; accordingly, the image quality of moving images can be improved by, for example, adaptively correcting only parts in which motion blur is detected, thereby reducing the width of motion blur included in the input image signal.

BRIEF DESCRIPTION OF THE DRAWINGS

FIG. 4 is a drawing illustrating details of the blur corrector 3;

FIGS. 5(a) to 5(f) are drawings illustrating the operation of the delay unit 1;

FIGS. 11(a) and 11(b) are drawings illustrating image signals in three consecutive frames;

FIG. 12 is a drawing illustrating the detailed structure of difference detector 11;

FIG. 15 is a drawing illustrating the structure of the blur period determiner 14;

FIGS. 16(a) and 16(b) are drawings illustrating the operation of binarizer 22;

FIG. 17 is a drawing illustrating the internal structure of the state determiner 25;

FIGS. 18(a) to 18(c) are drawings illustrating the operation of the state comparator 21;

FIGS. 19(a) to 19(e) are drawings illustrating the operation of the state corrector 29;

FIGS. 20(a) to 20(c) are drawings illustrating the operation of the blur determiner 26;

FIG. 21 is a drawing illustrating the detailed structure of the edge shape calculator 15;

FIGS. 22(a) to 22(d) are drawings illustrating the operation of the edge shape calculator 15;

FIGS. 23(a) to 23(c) are drawings illustrating the operation of the conversion signal generator 34; and FIGS. 24(a) to 24(c) are drawings illustrating the operation of the pixel converter 16.

Figure 1:
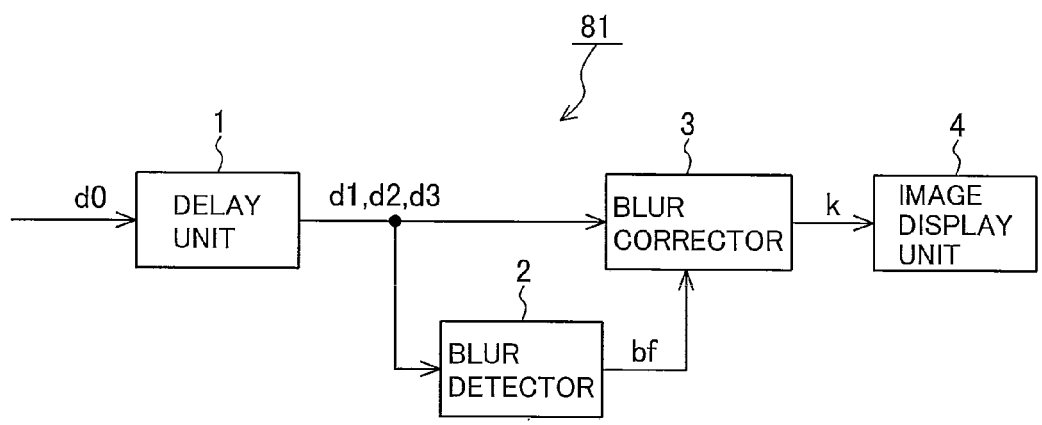
FIG. 1 is a block diagram illustrating the image display apparatus in a first embodiment of the present invention.

EXPLANATION OF REFERENCE CHARACTERS 1 delay unit, 2 blur detector, 3 blur corrector, 4 image display unit, 5 frame memory controller, 6 frame memory, 7, 8, 9 low-pass filters, 10 differentiator, 11, 12 difference detectors, 13 transition period detector, 14 blur period determiner, 15 edge shape calculator, 16 pixel converter, 17 ternarizer, 18 decision flag generator, 19 difference calculator, 20 difference corrector, 21 state comparator, 22, 23, 24 binarizers, 25 state determiner, 26 blur determiner, 27 difference detector, 28 differentiator, 29 state corrector, 30 pixel counter, 31 state D counter, 32 center detector, 33 core position determiner, 34 conversion signal generator, 81 image display unit.

BEST MODE FOR CARRYING OUT THE INVENTION

First Embodiment

FIG. 1 is a block diagram showing the structure of an image display apparatus according to the present invention. The illustrated image display unit 81 includes a delay unit 1, a blur detector 2, a blur corrector 3, and an image display unit 4. The delay unit 1 and the blur detector 2 constitute the motion blur detecting apparatus.

The image signal input to the image display unit 81 is supplied to the delay unit 1. The delay unit 1 uses a frame memory to add frame delays to the input signal, and outputs a plurality of frame-delayed signals d1-d3 to the blur detector 2 and blur corrector 3.

The blur detector 2 detects regions of motion blur in the image signal from the image signals d1-d3 output from the blur detector 2 for the plurality of different frames, and outputs a motion blur detection flag bf.

The blur corrector 3 converts image signal d2 output from the delay unit 1 according to the motion blur detection flag bf detected by the blur detector 2 and outputs the converted signal to the image display unit 4.

Figure 2:
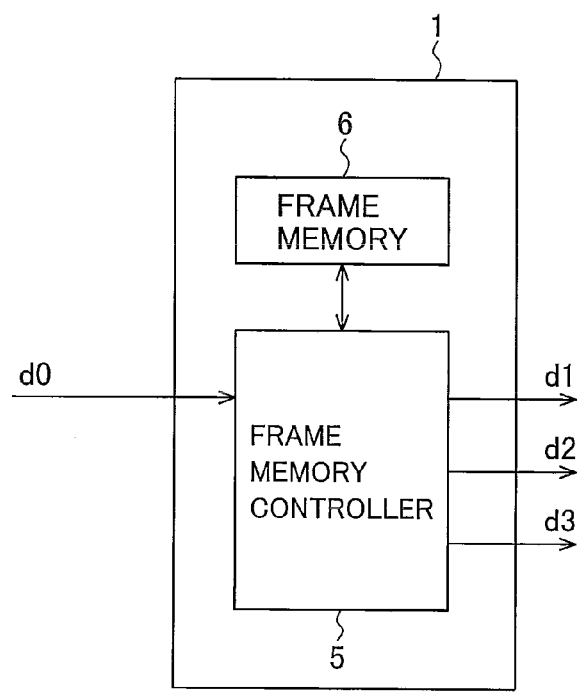
FIG. 2 is a block diagram illustrating details of the delay unit 1.

FIG. 2 is a block diagram illustrating details of the delay unit 1. The delay unit 1 comprises a frame memory controller 5 and a frame memory 6. The frame memory 6 has a capacity capable of storing at least two frames of the input image signal.

The frame memory controller 5, according to a memory address generated from synchronizing signals included in the input image signal d0, writes the input image signal, reads the stored image signal, and generates image signals d1, d2, d3 for three consecutive frames. Image signal d1 has no delay with respect to input image signal d0, and is referred to as the current-frame image signal. Image signal d2 is delayed by one frame with respect to image signal d1, and is referred to as the one-frame delayed image signal. Image signal d3 is delayed by one frame with respect to image signal d2, thus by two frames with respect to image signal d1, and is referred to as the two-frame delayed image signal. Since processing is performed on image signal d2, as will be seen below, image signal d2 may also be referred to as the target-frame image signal, image signal d1 as the preceding-frame image signal, and image signal d3 as the following-frame image signal.

Figure 3:
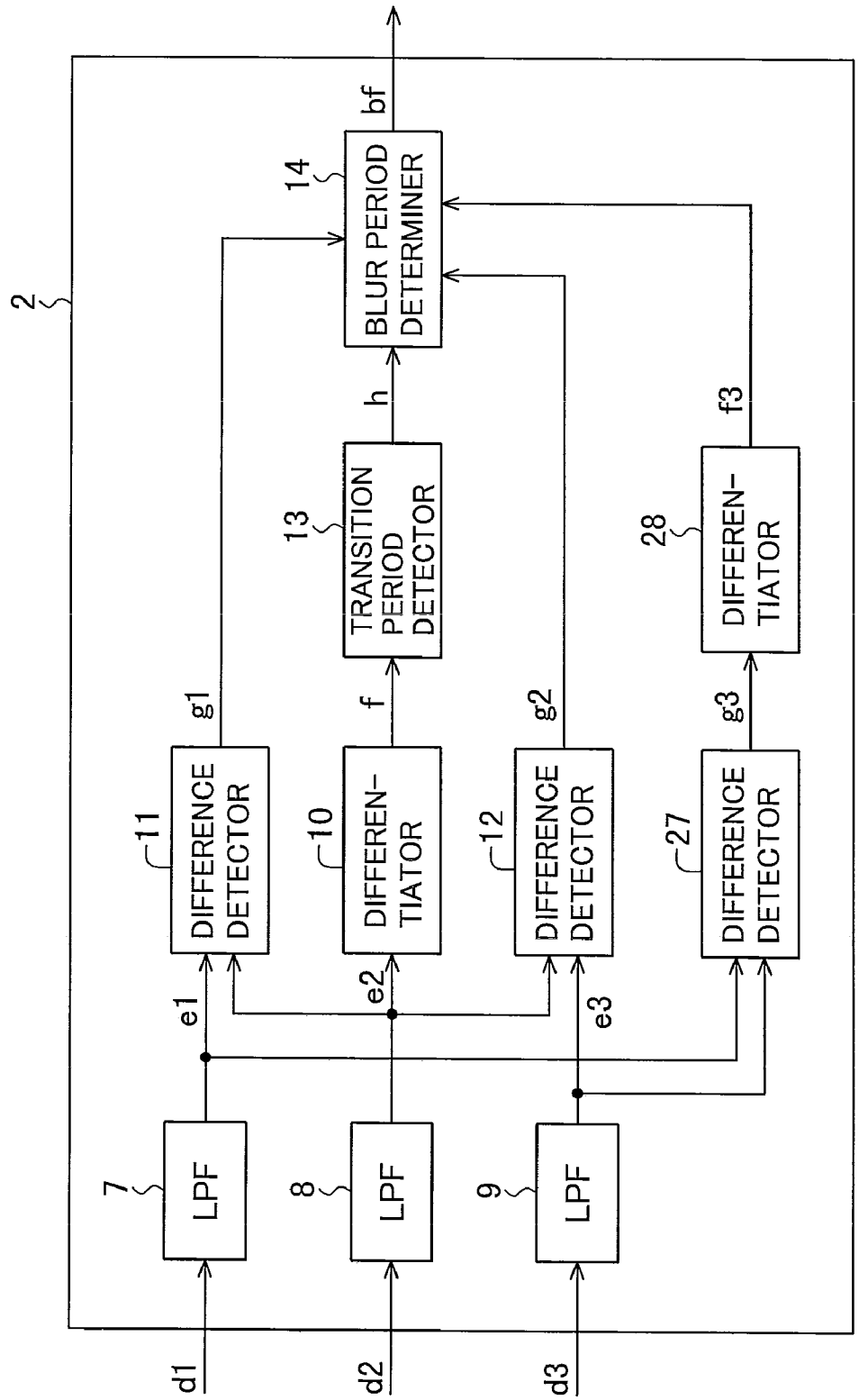
FIG. 3 is a block diagram illustrating details of the blur detector 2.

FIG. 3 is a block diagram illustrating details of the blur detector 2. The blur detector 2 has low-pass filters (hereinafter, LPFs) 7, 8, 9, a differentiator 10, difference detectors 11 and 12, a transition period detector 13, a blur period determiner 14, a difference detector 27, and a differentiator 28.

The image signals d1, d2, d3 output from the delay unit 1 are supplied to LPFs 7, 8, 9, respectively.

LPF 7 removes high-frequency components from the current-frame image signal d1 output from the delay unit 1 to generate an image signal e1, which is output to difference detectors 11 and 27.

LPF 8 removes high-frequency components from the one-frame delayed image signal d2 output from the delay unit 1 to generate an image signal e2, which is output to differentiator 10 and difference detectors 11 and 12.

LPF 9 removes high-frequency components from the two-frame delayed image signal d3 output from the delay unit 1 to generate an image signal e3, which is output to difference detectors 12 and 27.

Differentiator 10 detects changes in its input image signal e2 between adjacent pixels, thereby detecting differences between adjacent pixels, and outputs the detected results f to the transition period detector 13.

The transition period determiner 13 determines edges expected to have motion blur, based on the results f detected by differentiator 10, and outputs the determined results h to the blur period determiner 14.

Difference detector 11 detects differences between its input image signals e1 and e2, thereby detecting differences between pixels in the image signal at intervals of one frame, and outputs a difference correction signal g1 to the blur period determiner 14.

Difference detector 12 takes difference between its input image signals e3 and e2, thereby detecting differences between pixels in the image signal at intervals of one frame, and outputs a difference correction signal g2 to the blur period determiner 14.

Difference detector 27 takes differences between its input image signals e1 and e3, thereby detecting differences between pixels in the image signal at intervals of two frames, and outputs a difference correction signal g3 to differentiator 28.

Differentiator 28 detects changes between adjacent pixels in the difference correction signal g3, that is, differences between adjacent pixels, and outputs the results f3 of differentiation of the two-frame differences to the blur period determiner 14.

The blur period determiner 14 decides whether motion blur has occurred or not, thereby determining whether pixels are in blur periods or not, based on the determination results h output from the transition period determiner 13, the difference correction signals g1 and g2 calculated by difference detectors 11 and 12, and the results f3 of differentiation of the two-frame differences calculated by differentiator 28, and outputs a determination result bf.

FIG. 4 is a drawing illustrating details of the blur corrector 3. The blur corrector 3 has an edge shape calculator 15 and a pixel converter 16.

The edge shape calculator 15 calculates edge shapes from the input motion blur determination result bf and outputs a conversion control signal j to the pixel converter 16.

The pixel converter 16 converts image signal d2 based on the conversion control signal j and input image signals d1 and d3, and outputs the converted image signal k.

The operation of each constituent element of the image display unit 81 will now be described in further detail.

The image signal d0 input to the image display unit 81 is input to the delay unit 1.

FIGS. 5(a) to 5(f) are drawings illustrating relations between the input image signal d0 input to the delay unit 1 and the output image signals d1, d2, d3. The input image signal d0 is input in successive frames F0, F1, F2, F3 as shown in FIG. 5(b) in synchronization with the input vertical synchronizing signal SYI shown in FIG. 5(a). The frame memory controller 5 generates a frame memory writing address based on the input vertical synchronizing signal SYI, and has the frame memory 6 store the input image signal d0. And as shown in FIG. 5(d), the frame memory controller 5 outputs an image signal d1 (image signals of frames F0, F1, F2, F3) without delay with respect to the d0, in synchronization with the vertical synchronizing signal SYO shown in FIG. 5(c) (SYO is shown as being undelayed with respect to the input vertical synchronizing signal SYI). The frame memory controller 5 generates a frame memory readout address based on the input vertical synchronizing signal, reads out the one-frame delayed image signal d2 (FIG. 5(e)) and two-frame delayed image signal d3 (FIG. 5(f)) stored in the frame memory 6, and outputs these signals. As a result, the image signals d1, d2, d3 of three consecutive frames are output simultaneously from the delay unit 1. Specifically, during the time (frame interval) when the image signal of frame F2 is being input as image signal d0, the image signals of frames F2, F1, F0 are output as image signals d1, d2, d3, and during the time (frame interval) when the image signal of frame F3 is being input as image signal d0, the image signals of frames F3, F2, F1 are output as image signals d1, d2, d3.

The image signals d1, d2, d3 of three consecutive frames are output from the delay unit 1 to the blur detector 2 and the blur corrector 3. The image signals d1, d2, d3 input to the blur detector 2 are input to LPFs 7, 8, 9, respectively.

Figure 6:
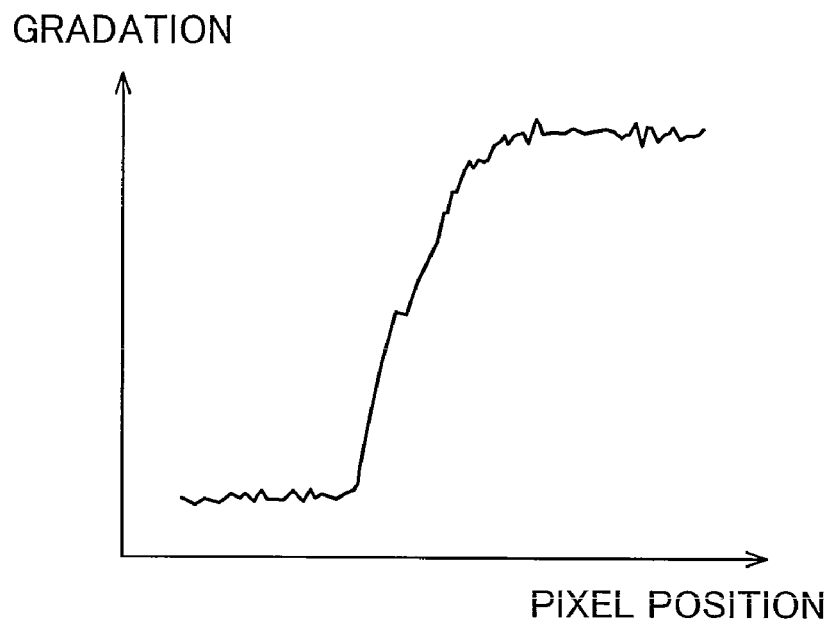
FIG. 6 is a drawing illustrating an exemplary image signal.

FIG. 6 shows exemplary image signals d1, d2, d3. The horizontal direction indicates pixel position; the vertical direction indicates gradation; an edge in an image having gradually changing gradations is shown.

The LPFs 7, 8, 9 remove high-frequency components from the image signals shown in FIG. 6. This is done because in images with relatively wide transition widths, in other words, in images with relatively fast motion, it is the blur caused by the frame integration time that poses a problem, and the high-frequency components of the input signal are not necessary for detection of blur caused by the frame integration time.

Figure 7:
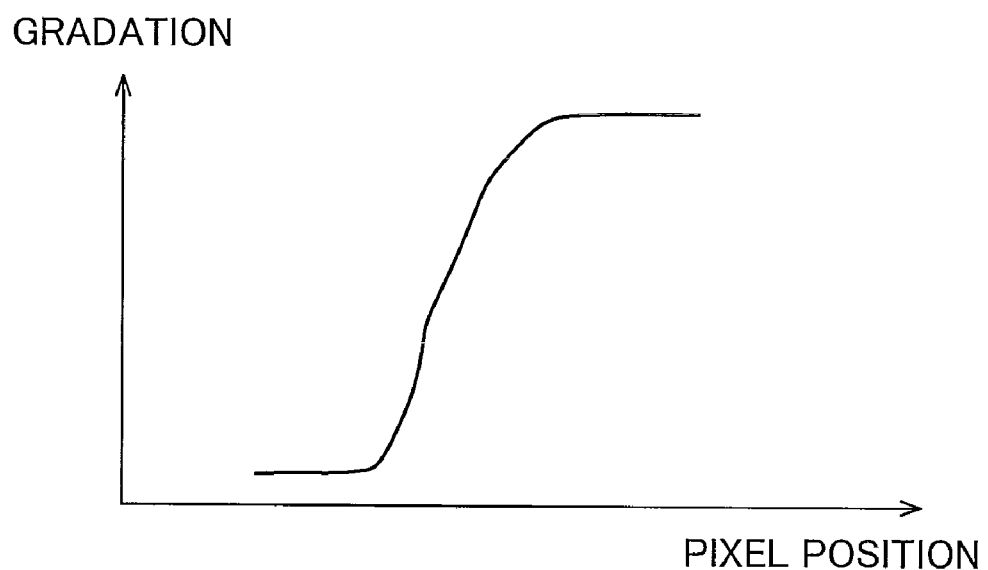
FIG. 7 is a drawing illustrating the exemplary image signal with high-frequency components removed.

FIG. 7 illustrates an exemplary image signal e generated by the removal of high-frequency components by LPFs 7, 8, 9.

The image signal e2 generated by removing the high-frequency components from the one-frame delayed image signal d2 is supplied to differentiator 10, and difference detectors 11 and 12.

Figure 8:
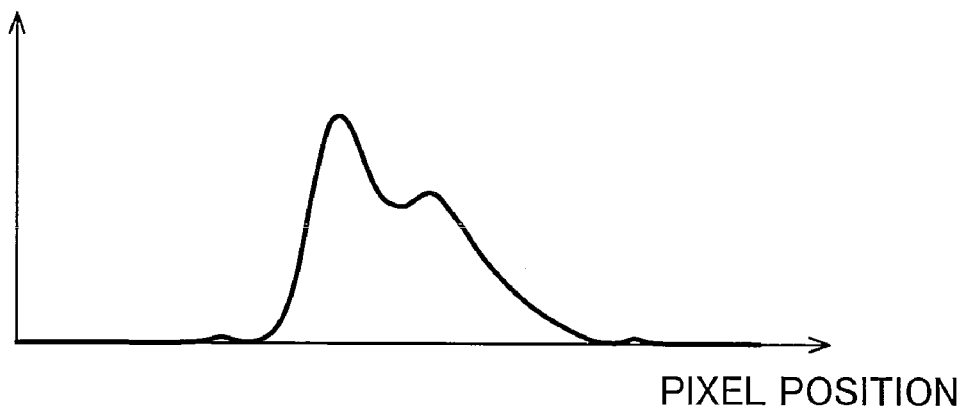
FIG. 8 is a drawing illustrating the result of differentiation of the image signal with high-frequency components removed.

Differentiator 10 calculates differentiated values of the input image signal e2. In the calculation of these values, the absolute value of the difference between adjacent pixels is calculated. FIG. 8 illustrates the result f of differentiation of the image signal e2 shown in FIG. 7.

Differentiator 10 outputs the result f of differentiation (differentiation result signal) to the transition period detector 13.

Figure 9:
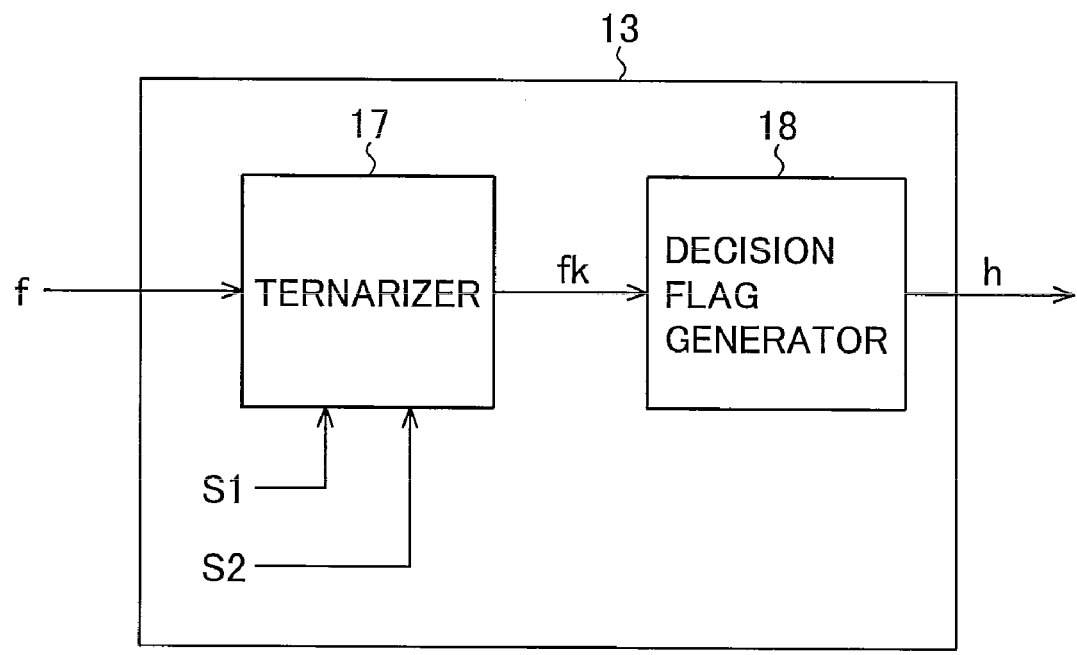
FIG. 9 is a drawing illustrating the detailed structure of the transition period detector 13.

FIG. 9 illustrates the detailed structure of the transition period detector 13. The illustrated transition period detector 13 has a ternarizer 17 and a decision flag generator 18.

The ternarizer 17 ternarizes the input signal f by using two predefined threshold values S1 and S2 (S1<S2), and outputs a ternary signal fk.

The decision flag generator 18 outputs a transition period determination result h based on the ternary signal fk.

Figure 10A:
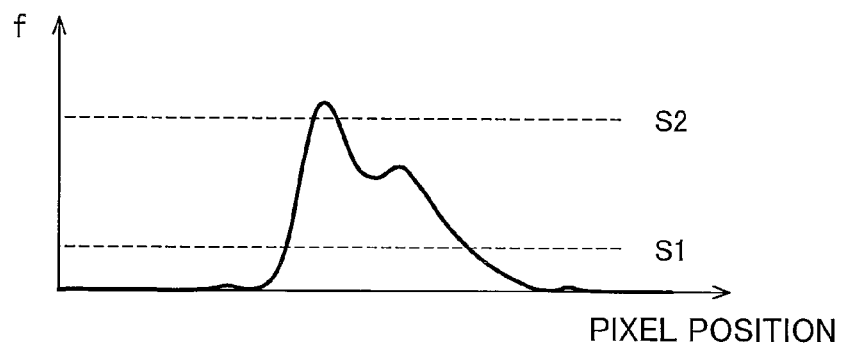
FIGS. 10(a) to 10(c) are drawings illustrating the operation of the transition period detector 13.
Figure 10B:
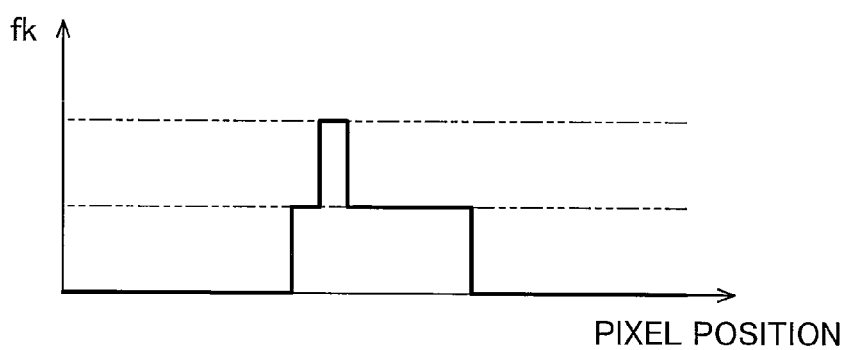
Figure 10C:
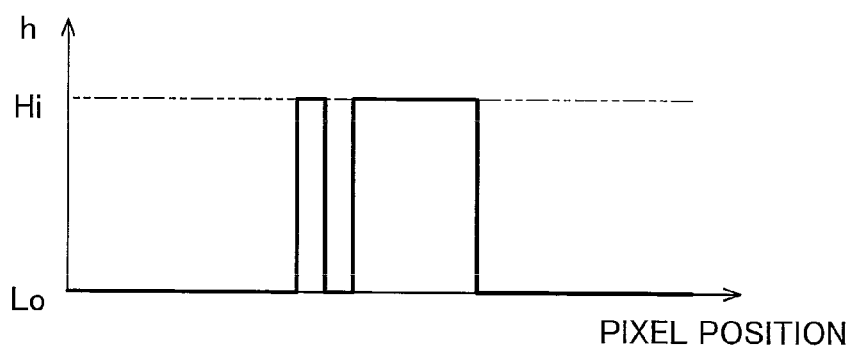

FIGS. 10(a) to 10(c) illustrate exemplary signals in the transition period detector 13. The horizontal axis represents pixel position. FIG. 10(a) illustrates the input signal f, FIG. 10(b) illustrates the ternary signal fk obtained from the signal f shown in FIG. 10(a), and FIG. 10(c) illustrates the result h of transition period determination obtained by classifying the ternary signal fk shown in FIG. 10(b) into intermediate values and other values.

In general, as the motion of a subject (relative motion with respect to the camera) becomes faster (wider blur), the image becomes more difficult to restore. Therefore, edges with little change that appear with rapid motion of a subject can be excluded from correction by setting a threshold value S1, and deciding that an edge is not in the transition period (setting the signal h indicating the transition period to the Lo level) when the signal f is less than the threshold value S1. Edges with steep slopes appear with slow motion of the subject, but the sharpness of edges with steep slopes is ensured without correction, so these edges can be excluded from correction by setting a threshold S2, and deciding that an edge is not in the transition period (by setting the signal h indicating the transition period to the Lo level) when signal f3 is larger than threshold S2.

The signal h is thus:

$h$=Hi, when $S1<f<S2$;

$h$=Lo otherwise, i.e., when $f \leq S1$ or $f \geq S2$.

The signal e2 output from LPF 8 is input to difference detectors 11 and 12, the signal e1 output from LPF 7 is input to difference detectors 11 and 27, and the signal e3 output from LPF 9 is input to difference detectors 12 and 27.

FIGS. 11(a) and 11(b) are drawings illustrating relations among the signals e1, e2, e3 in three consecutive frames.

In general, an image transmitted at 60 Hz is captured with a frame integration time of 1/60 second. When a subject is in motion, edges Ce3, Ce2, Ce1 are observed in a continuous sequence of frames as shown in FIGS. 11(a) and 11(b). Specifically, as shown in FIG. 11(a), when the subject is moving, the gradation change of the one-frame delayed signal e2 begins at the pixel position where the gradation change of the two-frame delayed signal e3 ends. Similarly, as shown in FIG. 11(b), the gradation change of the current-frame signal e1 begins at the pixel position where the gradation change of the one-frame delayed signal e2 ends.

FIG. 12 is a drawing illustrating the detailed structure of difference detector 11. The illustrated difference detector 11 has a difference calculator 19 and a difference corrector 20.

The difference calculator 19 calculates the difference between its input signals e1 and e2, and outputs the calculated result de. The difference calculation result de is supplied to the difference corrector 20.

The difference corrector 20 corrects the difference calculation result de by using a predefined threshold value S3, and generates and outputs a difference correction signal g1.

Figure 13:
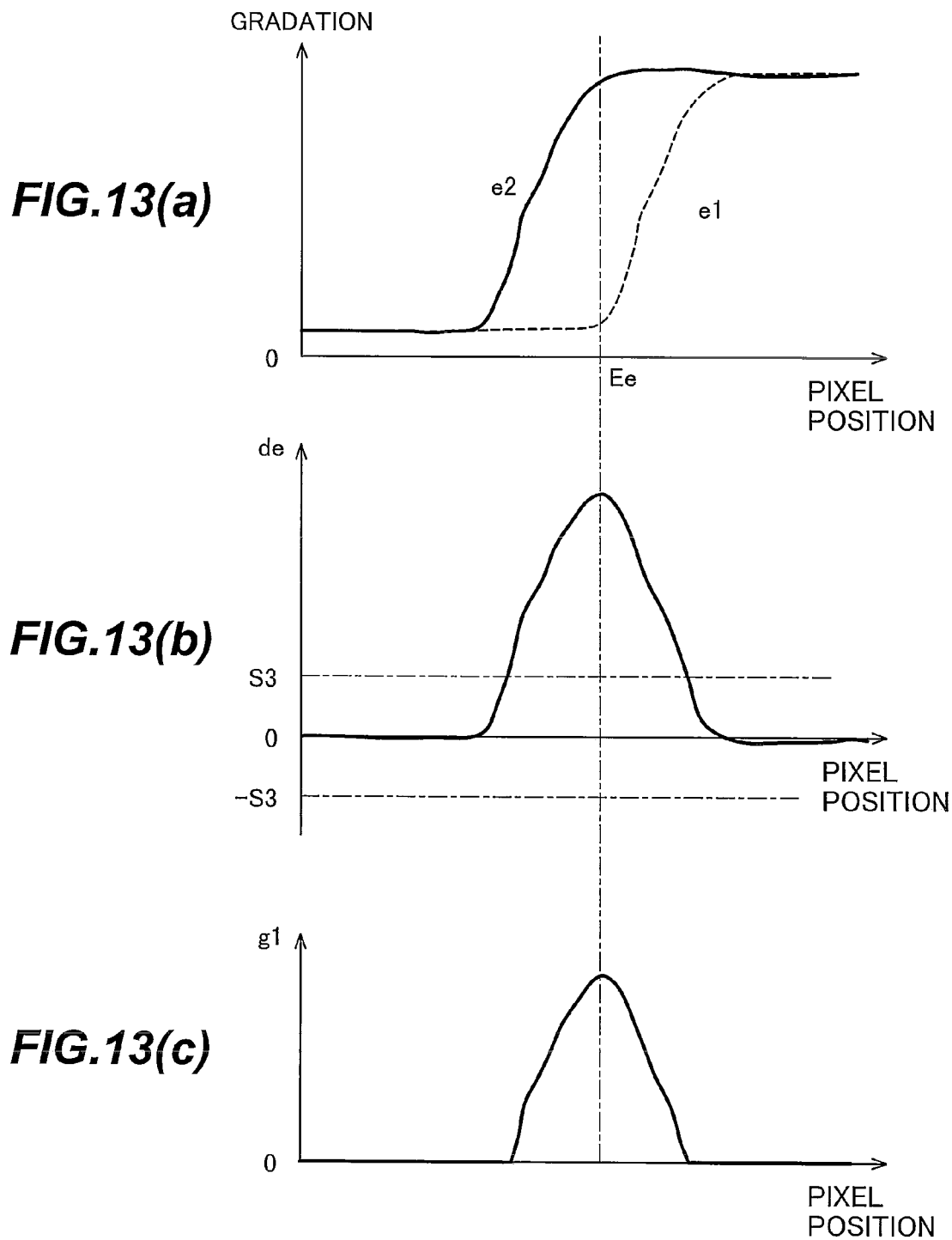
FIGS. 13(a) to 13(c) are drawings illustrating the operation of difference detector 11.

FIGS. 13(a) to 13(c) are drawings illustrating the operation of difference detector 11.

FIG. 13(a) illustrates signals e1 and e2 for two input frames. FIG. 13(b) illustrates the difference calculation result de (=e2−e1). FIG. 13(c) illustrates the generated difference correction signal g1. The horizontal axis in each figure represents pixel position.

When the signals e2 and e1 (FIG. 13(a)) input for two consecutive frames include a portion where the subject is in motion, when the difference between the frames is taken in the difference calculator 19, a difference calculation result de is obtained with a peak at the pixel position Ee where the edge continues from one frame to the next, as shown in FIG. 13(b).

The difference calculation result de output from the difference calculator 19 is input to the difference corrector 20. Since an image signal often includes a superimposed noise component, some differences may be detected by calculating the difference between frames in places where the subject is not moving. Therefore, the difference corrector 20 performs a process that reduces the difference calculation result de by the size of threshold value S3. Specifically, threshold value S3 is subtracted from the absolute value of the difference calculation result de. Therefore, a difference correction signal g1 (FIG. 13(c)) that has less false detection caused by noise is generated and output.

As will be understood from the following description, only the absolute value of the differences matters in the processing in the blur detector 2; either signal can be subtracted from the other signal when the difference is calculated in difference detector 27. This applies to difference detectors 11 and 12 as well.

The structure and operation of difference detector 12 is same as that of difference detector 11, except that signals e2 and e3 are input to difference detector 12 instead of signals e1 and e2, and signal g2 is output from difference detector 12 instead of signal g1.

Similarly, the structure and operation of difference detector 27 are same as the structure and operation of difference detector 11, except that signals e1 and e3 are input to difference detector 27 instead of signals e1 and e2, and signal g3 is output from difference detector 27 instead of signal g1.

Figure 14:
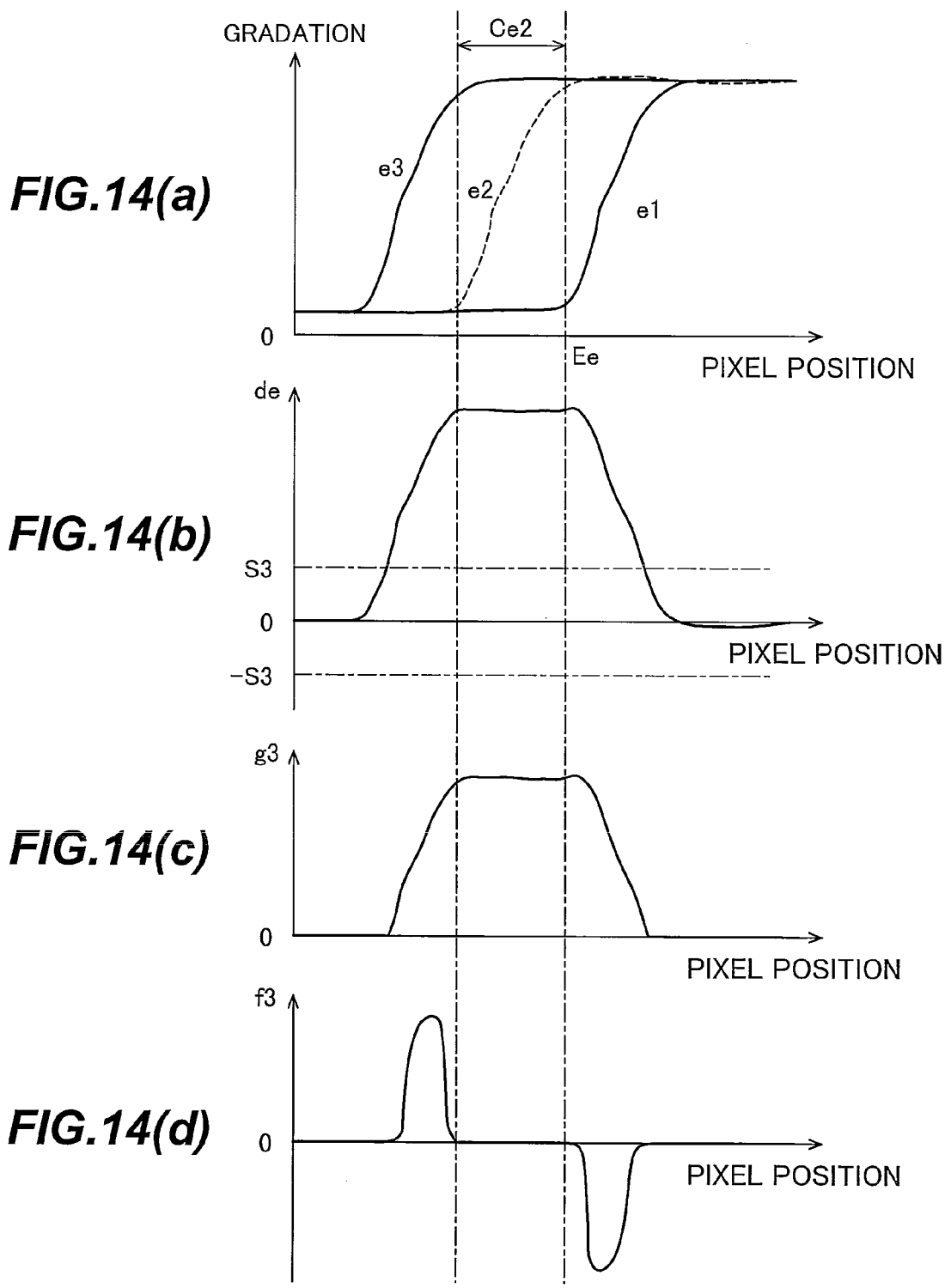
FIGS. 14(a) to 14(d) are drawings illustrating the operation of difference detector 27 and differentiator 28.

The drawings illustrate the process in which, from signals e1 and e3 (FIG. 14(a)), difference detector 27 calculates the difference de between e1 and e3 (FIG. 14(b)) and generates the difference correction signal g3 (FIG. 14(c)).

The quantities g1, g2, g3 are expressed by the following formulas.

If $|e2-e1|>S3$, then $g1=|e2-e1|-S3$.

Otherwise, $g1=0$.

If $|e3-e2|>S3$, then $g2=|e3-e2|-S3$.

Otherwise, $g2=0$.

If $|e3-e1|>S3$, then $g3=|e3-e1|-S3$.

Otherwise, $g3=0$.

The difference correction signal g3 (FIG. 14(c)) output from difference detector 27 is input to differentiator 28. Differentiator 28, operating in the same way as differentiator 10, calculates the differentiated value f3 (FIG. 14(d)) of signal g3. In the calculation of the differentiated value f3, the absolute value of the difference between adjacent pixels is calculated.

When an edge is blurred due to motion of a subject, at the edge Ce2 in the signal in the target frame (the one-frame delayed signal), the result f3 (FIG. 14(d)) of differentiation of the difference between the preceding and following frames (the difference between the two-frame delayed signal e3 and the current-frame signal e1) becomes substantially zero.

The difference correction signals g1 and g2 output from difference detectors 11 and 12, the differentiated value f3 output from differentiator 28, and the transition period determination result h output from the transition period detector 13 are input to the blur period determiner 14.

FIG. 15 is a drawing illustrating the structure of the blur period determiner 14. The differentiated value f3 is input to a binarizer 22. Binarizer 22 binarizes the differentiated value f3 by using a predefined threshold value S4 and outputs a binary difference correction signal dg3 to the state determiner 25.

Difference correction signal g1 is input to a binarizer 23. In an operation similar to that in binarizer 22, binarizer 23 binarizes the input difference correction signal g1 by using a predefined threshold value S5 and outputs a binary difference correction signal dg1 to the state determiner 25.

Similarly, difference correction signal g2 is input to a binarizer 24. In an operation similar to that in the binarizers 22 and 23, binarizer 24 binarizes the input difference correction signal g2 by using a predefined threshold value S6 and outputs a binary difference correction signal dg2 to the state determiner 25.

The state determiner 25 generates an edge condition flag gs based on the binary difference correction signals dg1, dg2, dg3, and outputs it to the blur determiner 26. The blur determiner 26 outputs a blur detection flag bf based on the edge condition flag gs and the transition period determination result h.

FIGS. 16(a) and 16(b) are drawings illustrating the operation of binarizer 22, indicating the relation between the input signal f3 and output signal dg3.

The input signal f3 (FIG. 16(a)) is binarized to 1 when its absolute value is larger than the predefined threshold value S4 and to 0 when its absolute value is smaller than the predefined threshold value S4, and the resultant value 1 or 0 is output to the state determiner 25. The resultant signal dg3 is shown in FIG. 16(b).

Binarizers 23 and 24 operate in the same way as binarizer 22, except that signals g1 and g2 are input to binarizers 23 and

24 instead of signal f3, and signals dg1 and dg2 are output from the binarizers 23 and 24 instead of signal dg3.

FIG. 17 is a drawing illustrating the internal structure of the state determiner 25. The illustrated state determiner 25 has a state comparator 21 and a state corrector 29.

The binary difference correction signals dg1 and dg2 input to the state determiner 25 are input to the state comparator 21. The state comparator 21 compares these two input difference correction signals dg1 and dg2, and outputs a state comparison signal gss to the state corrector 29. The state corrector 29 corrects the state comparison signal gss based on binary difference correction signal dg3 and outputs a state correction signal gs.

FIGS. 18(*a*) to 18(*c*) are drawings illustrating the operation of the state comparator 21. Suppose the binary difference correction signals dg1 and dg2 input to the state comparator 21 are the signals shown in FIGS. 18(*a*) and 18(*b*). The state comparator 21 outputs a state comparison signal gss (FIG. 18(*c*)) having one of three states (A, B, C) according to the state of the two binary difference correction signals. When both of the binary difference correction signals dg1 and dg2 are Lo, the state comparison signal gss is in state A. When the states of binary difference correction signals dg1 and dg2 differ from each other (when dg1≠dg2), the state comparison signal gss is in state B. When both of the binary difference correction signals are Hi, the state comparison signal gss is in state C.

FIGS. 19(*a*) to 19(*e*) are drawings illustrating the operation of the state corrector 29. The state comparison signal gss input from the state comparator 21 is a signal in either state A, B, or C, as shown in FIG. 19(*a*). When signal gss is in state C, the state corrector 29 corrects according to the state of binary difference correction signal dg3 (FIGS. 19(*b*) and 19(*d*)), and generates a state correction signal (flag) gs (FIGS. 19(*c*) and 19(*e*)).

Specifically, when signal gss is in state A, gs is placed in state A (same as gss), and when signal gss is in state B, gs is placed in state B (same as gss).

When signal gss is in state C and dg3=Lo, gs is placed in state D.

When signal gss is in state C and dg3=Hi as shown in FIG. 19(*d*), gs is placed in state C (same as gss), as shown in FIG. 19(*e*).

Thus, the state correction signal gs output from the state corrector 29 is a signal having one of four states.

FIGS. 20(*a*) to 20(*c*) are drawings illustrating the operation of the blur determiner 26.

The state correction signal gs output from the state determiner 25, shown in FIG. 20(*a*), has one of four states A, B, C, D; the transition period determination result h is a binary signal as shown in FIG. 20(*b*).

The blur determiner 26 operates on the state correction signal gs in states B, C, and D: when the transition period determination signal h is Lo, the signal in state B, C, or D is converted to state A, and the resultant signal is output. State A is a state that is excluded from blur correction. When the transition period determination signal h is Hi, the signal in state B, C, or D is output as-is. A signal in state A is output as-is regardless of whether the transition period determination signal h is Hi or Lo. In this way the blur determiner 26 generates and outputs a motion blur detection flag bf (FIG. 20(*c*)) that has one of four states A, B, C, D.

The motion blur detection flag bf with one of four states A, B, C, D output from the blur detector 2 and the image signals d1, d2, d3 output from the delay unit 1 are input to the blur corrector 3. Since the structure of the blur corrector 3 has already been described with reference to FIG. 4, the operation of the blur corrector 3 will now be described.

The motion blur detection flag bf input to the blur corrector 3 is input to the edge shape calculator 15. FIG. 21 is a drawing illustrating the detailed structure of the edge shape calculator 15. The edge shape calculator 15 has a pixel counter 30, a state D counter 31, a center detector 32, a core position determiner 33, and a conversion signal generator 34.

The motion blur detection flag bf is input to the pixel counter 30, the state D counter 31, and the conversion signal generator 34.

The pixel counter 30 outputs a count value c1 obtained by counting the pixel clock from the start of the processing of each line on the screen, as data indicating pixel position on the line.

The state D counter 31 outputs a count value c2 obtained by counting the pixel clock from the start to the end of state D in the motion blur detection flag bf, as data indicating the width (duration) of state D.

The pixel clock is a clock generated to synchronize the processing in different parts in the image processing apparatus; the signals of one pixel are processed each time a pixel clock is generated.

The count results c1 and c2 output from the pixel counter 30 and state D counter 31 are input to the center detector 32.

From the count results c1 and c2, the center detector 32 detects the central position c3 (data indicating the position) in the state D interval. The detected central position c3 of the state D interval is output to the core position determiner 33. The core position determiner 33 calculates the core region at the time of blur correction using a predefined threshold value S7 and outputs a core region determination flag c4.

The core region determination flag c4 is sent to the conversion signal generator 34. The conversion signal generator 34 outputs the conversion control signal j based on the input motion blur detection flag bf and core region determination flag c4.

FIGS. 22(*a*) to 22(*d*) are drawings illustrating the operation that generates the core region determination flag c4 based on the motion blur detection flag bf, the pixel counter output c1 and the state D counter output c2.

When the motion blur detection flag bf shown in FIG. 22(*a*) is input to the state D counter 31, the state D counter value c2 (FIG. 22(*c*)) is incremented up to 9, generating a maximum count value c2max of 9. The center detector 32 performs the following calculation, based on the output result c1 (FIG. 22(*b*)) when the maximum count value c2max is attained, to calculate the central position c3 of state D (fractions are rounded up or rounded down):

$$c3 = c1 - (c2\max - 1)/2$$
$$= 12 - (9 - 1)/2$$
$$= 8$$

In the example shown, c3 is '8'. The central position c3 (data indicating the position) is output to the core position determiner 33.

The core position determiner 33 calculates the core region at the time of blur correction, based on the predefined threshold value S7 and the central position c3 of the state D output from the center detector 32, and outputs the core region determination flag c4 (FIG. 22(*d*)). For example, c3−S7 to c3+S7 is made the core region, and the core region determination flag c4 is made Hi during this period. In the following description, the threshold value S7 is '2'.

Since the central position c3 of state D output from the center detector 32 under the condition defined in FIGS. 22(a) to 22(c) is '8', the core region determination flag c4 (FIG. 22(d)) is Hi at pixel positions from c1b=c3−S7=8−2=6 to c1e=c3+S7=8+2=10.

FIGS. 23(a) to 23(c) are drawings illustrating the operation of the conversion signal generator 34, showing relations among the input motion blur detection flag bf (FIG. 23(a)), core region determination flag c4 (FIG. 23(b)), and output conversion control signal j (FIG. 23(c)). The conversion signal generator 34 converts the state of the input motion blur detection flag bf to state E during intervals when the core region determination flag c4 is Hi. During intervals when c4 is Lo, bf is output unchanged as the conversion control signal j.

As a result, the conversion control signal j output from the conversion signal generator 34 has one of five states A, B, C, D, E.

The conversion control signal j output from the edge shape calculator 15, together with image signals d1, d2 and d3, is input to the pixel converter 16. The pixel converter 16 generates an image signal k from the input image signals d1, d2, d3 based on the state of the conversion control signal j, and outputs signal k to the image display unit 4.

FIGS. 24(a) to 24(c) show an example of the generation of image signal k. Suppose that the image signals d1, d2, d3 input to the pixel converter 16 are as shown in FIG. 24(a) and the conversion control signal j is as shown in FIG. 24(b). When the conversion control signal j is in state B or D:

if $|d2-d1|>|d2-d3|$, then d3 is output as the output image signal k; and if $|d2-d1|\leq|d2-d3|$, then d1 is output as the output image signal k (FIG. 24(c)).

In other words, of signals d3 and d1, the signal that differs least from d2 is output as the output image signal k.

When the conversion control signal j is not in state B or D, (that is, when it is in one of states A, C, and E), then d2 is output as the output image signal k. Thus in state E (the core region in the center of the blur period), image signal d2 is output as k, while in state D (regions other than the core region in the blur period), signal d3 or d1, whichever differs by less from d2, is output as the output image signal k.

By this processing, the transition width of edges, which is the source of blur, can be reduced, compared to the case where image signal d2 is used for display without this processing.

As described above, when a moving image is displayed, its image quality can be improved by detecting regions with motion blur included in the image, based on features of frame-to-frame differences in the input image signal, and reducing the blur width according to the degree of the detected motion blur.

An energy saving effect is also obtained because this configuration can be implemented in a relatively small circuit.

What is claimed is:

1. A motion blur detector comprising:
   a delay unit for generating a first image signal with no frame delay with respect to an input image signal, a second image signal with a delay of a first predetermined number of frames with respect to the input image signal, and a third image signal with a delay of the first predetermined number of frames with respect to the second image signal;
   a first difference detector gradation differences between the first image signal and the second image signal;
   a second difference detector for detecting gradation differences between the second image signal and the third image signal;
   a third difference detector for detecting gradation differences between the first image signal and the third image signal;
   a differentiator for detecting signal changes between adjacent pixels in the gradation differences detected by the third difference detector;
   a transition period detector for detecting gradation changes between adjacent pixels in the second image signal, and using the gradation changes to detect gradation transition periods in the image signal; and
   a blur determiner for detecting motion blur periods based on the gradation differences detected by the first difference detector, the gradation differences detected by the second difference detector, differentiation results detected by the differentiator, and the gradation transition periods in the second image signal detected by the transition period detector.

2. The motion blur detector of claim 1, wherein the delay unit has a frame memory operable to store a plurality of frames of the input image signal and the delay unit generates the first image signal by giving the input image signal no frame delay, generates the second image signal by using the frame memory to delay the first image signal by the first predetermined number of frames, and generates the third image signal by using the frame memory to delay the second image signal by the first predetermined number of frames.

3. The motion blur detector of claim 2, wherein the delay unit has a frame memory operable to store two frames of the image signal and the delay unit generates the first image signal, generates the second image signal by delaying the first image signal by one frame, and generates the third image signal by delaying the second image signal by one frame.

4. The motion blur detector of claim 1, wherein the transition period detector designates the transition periods when an absolute value of the gradation changes between adjacent pixels in the second image signal is greater than a first predetermined threshold value and less than a second predetermined threshold value.

5. The motion blur detector of claim 1, wherein the blur determiner determines the motion blur periods based on:
   the gradation transition periods in the second image signal detected by the transition period detector,
   the gradation differences between the first image signal and the second image signal detected by the first difference detector, and
   the gradation differences between the second image signal and the third image signal detected by the second difference detector.

6. The motion blur detector of claim 5, wherein the blur determiner determines that the gradations in the second image signal are blur periods within the transition periods when:
   an absolute value of the gradation differences between the first image signal and the second image signal is greater than a predetermined value,
   an absolute value of the gradation differences between the second image signal and the third image signal is less than a predetermined value, and
   an absolute value of the differentiation results detected by the differentiator is less than a predetermined value.

7. The motion blur detector of claim 1, wherein the blur determiner determines the motion blur periods based on the gradation transition periods in the second image signal detected by the transition period detector and the results obtained by the differentiator by differentiating the gradation differences between the first image signal and the third image signal detected by in the third difference detector.

8. The motion blur detector of claim 7, wherein the blur determiner determines the motion blur period only when the differentiator's differentiation results are less than a predetermined third threshold value.

9. The motion blur detector of claim 1, wherein the blur determiner designates a motion blur period only when at least one of the gradation difference between the first image signal and the second image signal detected by the first difference detector and the gradation difference between the second image signal and the third image signal detected by the second difference detector is greater than a predetermined fourth threshold value.

10. An image processing apparatus comprising a blur corrector for correcting the second image signal based on results of detection of the motion blur periods by the motion blur detector of claim 1, wherein
the blur corrector corrects the second image signal only during the motion blur periods detected by the blur determination apparatus.

11. The image processing apparatus of claim 10, wherein the blur corrector selects and outputs one of the first image signal, the second image signal, and the third image signal based on results determined by the blur determiner.

12. The image processing apparatus of claim 11, wherein:
the blur corrector has an edge shape calculation unit and a pixel conversion unit;
the edge shape calculation unit detects a core region located in a center portion of the blur periods detected by the blur determiner;
the pixel conversion unit selects and outputs the second image signal in the core region, and outputs the first image signal or the third image signal, whichever differs less from the second image signal, in regions other than the core region.

13. An image display apparatus comprising:
the image processing apparatus of claim 10; and
a display unit for displaying an image based on image data output from the image processing apparatus.

14. A motion blur detection method comprising:
a delay step of generating a first image signal with no frame delay with respect to an input image signal, a second image signal with a delay of a first predetermined number of frames with respect to the input image signal, and a third image signal with a delay of the first predetermined number of frames with respect to the second image signal;
a first difference detection step of detecting gradation differences between the first image signal and the second image signal;
a second difference detection step of detecting gradation differences between the second image signal and the third image signal;
a third difference detection step of detecting gradation differences between the first image signal and the third image signal;
a differentiation step of detecting signal changes between adjacent pixels in the gradation differences detected in the third difference detection step; and
a transition period detection step of detecting gradation changes between adjacent pixels in the second image signal, and using the gradation changes to detect gradation transition periods in the image signal; wherein
the motion blur detection method detects motion blur periods based on the gradation differences detected in the first difference detection step, the gradation differences detected in the second difference detection step, differentiation results detected in the differentiation step, and the gradation transition periods in the second image signal detected in the transition period detection step.

* * * * *